Feb. 24, 1931. T. A. JONES ET AL 1,793,491
CURRENT LIMITING DEVICE
Filed Aug. 21, 1928    2 Sheets-Sheet 2
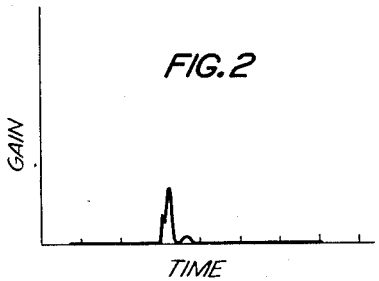
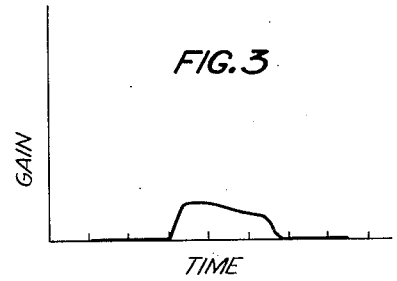
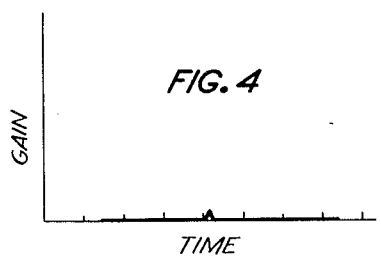
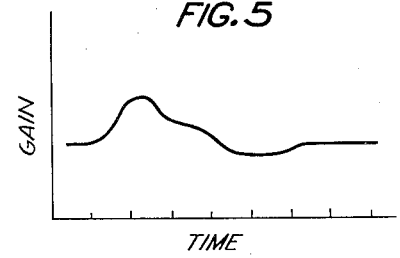
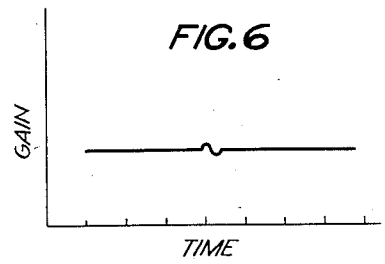
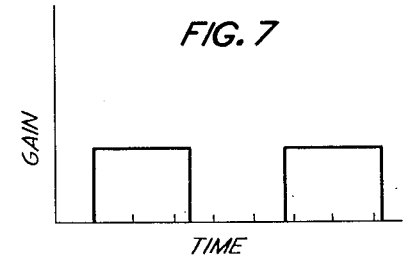
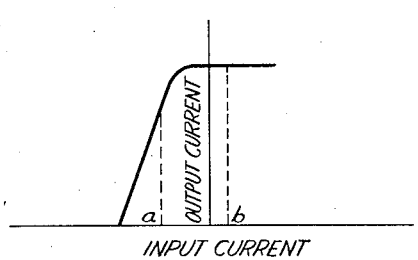
INVENTORS: THEODORE A. JONES
WALTER A. PHELPS
BY
ATTORNEY Patented Feb. 24, 1931

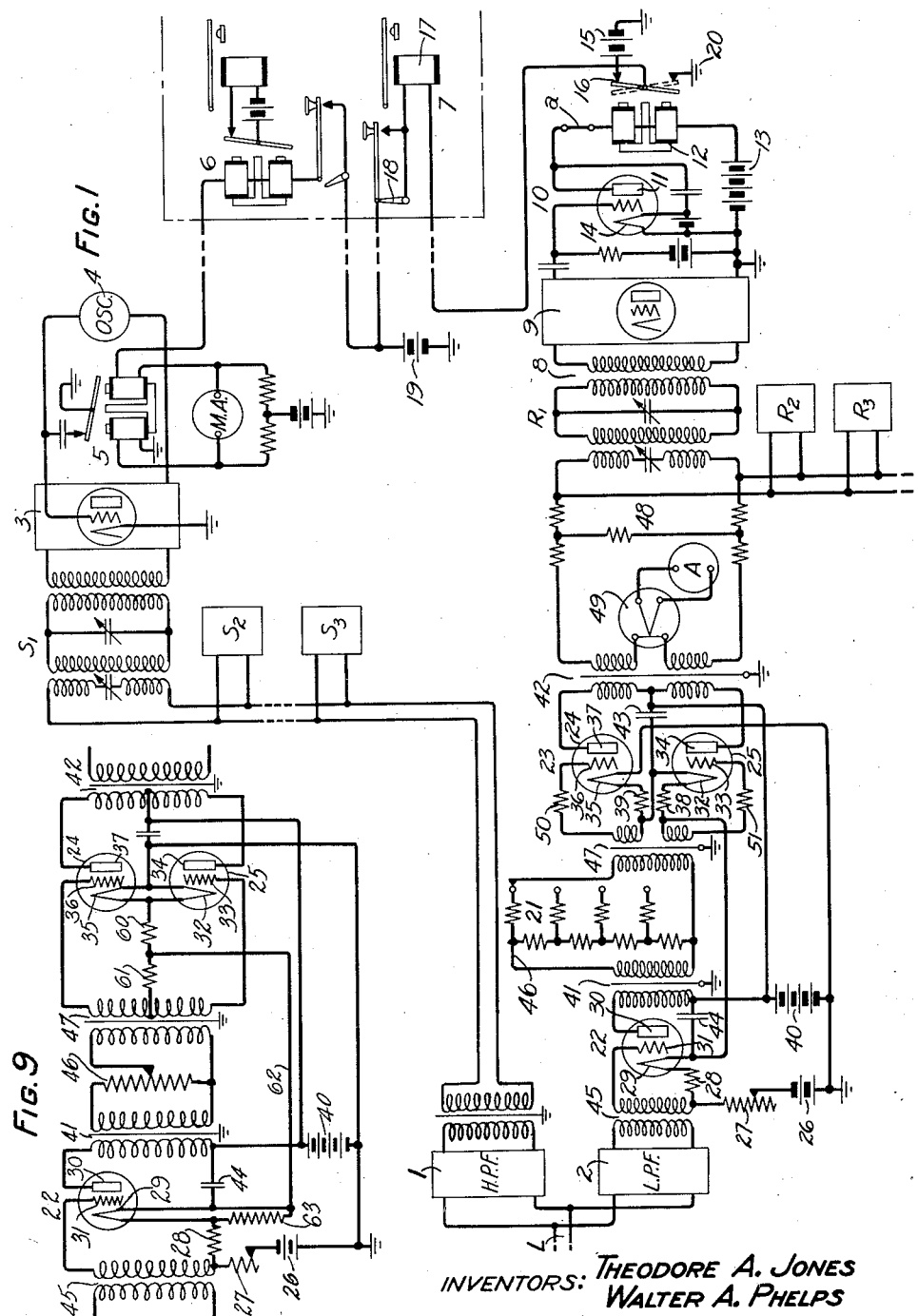

1,793,491

UNITED STATES PATENT OFFICE

THEODORE A. JONES, OF NEW YORK, N. Y., AND WALTER A. PHELPS, OF MADISON, NEW JERSEY, ASSIGNORS TO BELL TELEPHONE LABORATORIES, INCORPORATED, OF NEW YORK, N. Y., A CORPORATION OF NEW YORK

CURRENT-LIMITING DEVICE

Application filed August 21, 1928. Serial No. 301,108.

This invention relates to power limiting devices and especially to those which prevent surges of electrical power due to lightning or other static disturbances in the neighborhood of intelligence transmission systems from interfering with the proper operation thereof.

An object of the invention is to protect a system containing reactive elements having energy storing properties from the effects of electrical or static disturbances to which the system may be exposed.

Another object of the invention is to place an upper limit upon the power transmitted to a plurality of receiving channels, the respective signals for which are separated by selectively tuned elements.

Experimental data show that when the line of a transmission system is exposed to lightning flashes or other static disturbances, the surges of energy therein may be materially greater than the energy of the transmitted signals although of much shorter duration. Ordinarily the period of the lightning flash would not be of sufficient duration to effect the recording of a signal. Measurements have determined, however, that the effect of the lightning surge in a carrier telegraph system, for example, extends over a much greater period of time than the actual duration of the lightning flash. This prolonging of the effect is due to the influence of a number of circuit elements which store the energy of the short flashes and release it in the form of damped oscillations which in some instances are many times the length of the original impulse. Due to the effect of the damped oscillations on the signal sounders, the reception of signals may be seriously interfered with, resulting at times in the complete destruction of the telegraph signals during periods of intense static disturbances.

In accordance with the object of the present invention the energy of the lightning pulse is limited to a value not greatly in excess of the total signal energy transmitted over the line before the pulse is allowed to strike the circuit elements which have the tendency to store the lighting pulses. The energy absorbed is thereby greatly reduced both in magnitude and duration to a point where the disturbing effect on the telegraph sounders practically disappears.

In the preferred form of the invention a current limiting device is located in the incoming circuit between the line and the individual receiving circuits in a part thereof which is common to the receiving circuits. The limiting device comprises a pair of vacuum tube amplifiers arranged in push-pull relation which exhibit a characteristic having a sharply rising portion, a sharply bending portion and a flat top denoting a region of saturation. By means of an adjustable amplifier ahead of the limiting device the current is adjusted to operate on the straight portion of the curve just below the knee. During periods of severe static disturbances, however, the interference currents are greatly in excess of the normal signal currents in the line. The interfering currents cause the limiting device to operate on the saturated portion of the curve thereby effectively blocking the amplifiers and preventing the heavy surges of current from reaching the elements which have the energy storing tendencies. Since the lightning flashes are of short duration substantially no effect is produced upon the operation of the receiving instruments when there is no storage of energy.

A better understanding of the invention may be had by reading the following description together with the accompanying drawings of which Figs. 1 and 9 represent different embodiments of the invention as applied to a multiplex carrier telegraph system, and Figs. 2 to 8 curves which illustrate the operation of the invention.

Referring to Fig. 1, the terminal apparatus of a multiplex carrier telegraph system is shown connected to a line L which in some regions may be exposed to severe static disturbances such as lightning storms. The line terminates in a plurality of sending and receiving circuits, each of which operates in a different band of frequencies separated by the selectively tuned circuits $S_1$, $S_2$, $S_3$, $R_1$, $R_2$, $R_3$, etc. It is quite necessary that some means, such as the low and high-pass filters 1 and 2, be provided for preventing the outgoing signals from feeding into the receiving channels as the energy level of the former greatly exceeds the latter and would prevent the discrimination which the power limiting device provides between the incoming signals and the lightning flashes. The sending and receiving channels are in different frequency groups, either of which may be the low or the high group.

The sending circuits comprise the tuned circuit $S_1$, the amplifier 3, the source of oscillations 4, a relay 5, and telegraph subscriber's apparatus 6 similar to and operated in like manner to that illustrated in Patent No. 1,469,259 issued to B. P. Hamilton on October 2, 1923.

The receiving circuits comprise the tuned circuits or band pass filters $R_1$, $R_2$, $R_3$, etc. for separating the signal bands into their respective channels, each of which terminates in a different subscriber's station apparatus similar to that shown at 7. As the subscriber's apparatus associated with the respective channels is the same, only that associated with $R_1$ and $S_1$ is shown so as not to complicate the drawing.

The filter $R_1$ is coupled through transformer 8 to the amplifier 9, the output of which is rectified by the rectifier 10 which may be a rectifier of any well known type. The direct current path of the rectifier plate circuit may be traced from the plate 11 of the tube, through the windings of the relay 12 to the source of plate potential 13, the filament 14 of the tube, and back to the plate 10. The relay 12 is shown in the spacing position indicating an interval between signals or that no signals are being transmitted. When the relay 12 is in this position a circuit may be traced from the positive pole of battery 15, through the armature 16 of the relay 12, through the winding of the sounder 17, the closing switch of the key 18 to the positive pole of battery 19. The batteries 15 and 19 are of equal voltage and in the spacing position of the relay their polarities are opposed in consequence of which no current flows through the winding of the sounder 17. During the reception of a signal the armature of the relay 12 is in the marking position closing a circuit from ground at 20, through the armature 16 in the dotted position, through the winding of sounder 17, the key 18 to battery 19 and ground. When the armature is in this position a circuit is closed through the battery 19 to operate the sounder 17.

The power limiting device 21 is connected between the filter 2 and the receiving tuned circiuts $R_1$, $R_2$ and $R_3$ which separate the carrier channels in the receiving branch of the circuit. In this position it is common to all the carrier channels. The power limiting device 21 comprises a vacuum tube amplifier 22 and a push-pull amplifier 23 comprising three-electrode vacuum tubes 24, 25. The filaments of the amplifier tubes are connected in a series circuit which may be traced from the negative pole of battery 26, through the rheostat 27, resistance 28, the filament 29 of tube 22, resistance 38, filament 32 of tube 25, resistance 39, filament 35 of tube 24, back to the positive pole of the battery 26 which is grounded.

Plate potential is supplied from a suitable source 40 to the plate 30 of amplifier 22, through the primary winding of the transformer 41, and to the plates 37 and 34 of the balanced amplifier 23 through opposite halves of the primary winding of transformer 42 in parallel. Condensers 43 and 44 are provided for separating the plate circuits from the filament circuits of the amplifiers 23 and 22 respectively.

The input circuit of the amplifier 22 is connected to the output of the filter 2 by the transformer 45, while the output of the amplifier is coupled to the input of the balanced amplifier 23 through the potentiometer 46 by means of transformers 41 and 47. In some instances, e. g., in clear weather, it may be desirable to operate the circuit without the power limiting device 21, in which case the line L would be coupled through a transformer to the input of the tuned circuits $R_1$, $R_2$, $R_3$, for which reason it is desirable that the total overall gain of the power limiting device be zero, a condition which may necessitate using a resistance pad 48 to attenuate the output current of the amplifier. An ammeter 49 enables the energy level of the limiting device to be accurately adjusted.

A negative grid bias is obtained for each of the amplifying tubes from the drop in potential across resistances 28, 38 and 39 respectively, which are connected in the filament circuits of the tubes. Resistances 50 and 51 are placed in the grid circuits of the tubes 24 and 25 to give the characteristic shown in Fig. 8, the purpose of which will be hereafter explained.

In order that a better understanding of the operation of the circuit may be had the nature of the lightning flashes to which the system is exposed and their effects upon the circuit under different conditions should be appreciated. For this purpose reference may be had to the oscillograms shown in Figs. 2 to 6, which were taken at a point $a$ in the circuit just beyond the rectifier 10 and illustrate the current which is effective on the relay 12 resulting from a lightning pulse.

A good idea of the exact nature of the lightning flash may be obtained from Fig. 2, which was taken with the filters removed from the circuit and with relay 12 on the spacing contact, in which condition no rectified current is flowing in the relay winding. Since the time scale in all the figures is identical it is evident that the lightning pulse is short as compared with the period of a normal signal shown in Fig. 7 and is of such short duration that relay 12 does not respond. However, when the filters $R_1$, $R_2$, etc. and 2 are introduced into the circuit without the power limiting device a different effect may be noted. Although the lightning pulse is of the same duration as that illustrated in Fig. 2 the current pulse effective at the relay 12 is nevertheless longer in duration than the signals being received. The prolongation of the interference pulse is due to a storing of energy in some of the circuit elements followed by a release of the energy in the form of damped oscillations. When this current is rectified, the shape of the pulse effective on the relay 12 is shown in Fig. 3. Although pulses of lightning of but one polarity have been shown, it must be remembered that both polarities prevail in the field. Consequently, it is essential that the amplifier be balanced to accommodate either polarity.

When the relay 12 is on the marking contact i. e., when the armature 16 is in the dotted position, a small amount of current necessary to actuate the relay is flowing in the plate circuit of the rectifier 10. The effect of the lightning pulse on the current flowing in the relay winding during the marking signal is shown in Fig. 5. Here again the energy of the pulse is stored and its release prolonged over an extended period of time. In this instance current from the lightning pulse augments the current which is necessary to hold the relay in the marking position for a short period of time and then reduces the current flowing in the relay winding to a value which in some instances may be too small to maintain the relay in the marking position.

By means of the power limiting device which is the subject of this invention heavy pulses of energy from the lightning flashes are prevented from reaching the receiving tuned circuits, thereby preventing the absorption of power which is later released over an extended period of time to falsely operate the relay 12.

Fig. 4 shows the rectified current flowing in the relay winding from a lightning pulse when the relay is on the spacing contact with the power limiting device, filter 2 and the receiving tuned circuit $R_1$, $R_2$, etc. in the circuit, while Fig. 6 shows the corresponding effect upon the current when the relay is on the marking contact.

All of the oscillograms were obtained under conditions more severe than those normally encountered in the field so that the effectiveness of circuit 21 in suppressing lightning disturbance was very marked as is apparent from a comparison of Fig. 3 with Fig. 4 and Fig. 5 with Fig. 6.

The characteristic curve of the balanced amplifier 23 is shown in Fig. 8. It has a sharply rising straight portion, a sharply bending knee portion and a horizontal portion which denotes saturation of the amplifier. The circuit is normally operated well up on the straight portion of the characteristic curve just below the knee at a point denoted by $a$ in Fig. 8. The discrimination between the signals and the lightning pulses is more pronounced the higher on the characteristic the amplifier operates, although care must be taken that the knee portion of the curve be not used for normal signal reception since modulation between the signals of the respective channels would be likely to occur. The point on the characteristic at which the amplifier operates may be fixed by the amplifier 22 and the potentiometer 46.

During normal operation of the system the incoming carrier signals from the line L are directed into their proper channel by means of the filters 1 and 2, traverse the power limiting device 21 to the receiving tuned circuits $R_1$, $R_2$, $R_3$, etc., which selectively separate the carrier bands. However, during periods of intense static disturbances heavy surges of energy due to lightning are impressed upon the power limiting device from the line. Under these conditions there is a tendency for the grid of one of the tubes to be driven positive and the resulting grid current flowing through the resistance associated with the tube, (either 50 or 51 as the case might be) produces a potential which is in effect an additional negative grid biasing potential. Accordingly, the output of the tube is not proportional to the input voltage, and the resulting characteristic curve of the amplifier is as shown in Fig. 8.

The amplifier normally operates at a point $a$ of the curve just below the knee. During heavy lightning pulses, however, there is a shift of the operating point to a position on the flat part of the curve such as $b$.

Under these conditions the gain of the amplifier is limited and large surges of energy are prevented from being impressed upon the receiving tuned circuits $R_1$, $R_2$, etc. Since there is no prolonged discharge of the receiving tuned circuits as in the case where the power limiting device is not used, the lightning pulse is effective upon the relay only for a negligible period of time not sufficiently great to interfere appreciably with its operation.

Fig. 9 shows another form of the power limiting device which may be connected in the circuit of Fig. 1 between the transformers 45 and 42 in place of the one therein shown and whose function and operation with respect to the rest of the circuit is substantially identical therewith.

The same reference characters have been used to designate corresponding elements of the two circuits. In Fig. 9, the filaments 35 and 32 of tubes 24 and 25 respectively are in parallel, which in some instances may tend to give a better balanced circuit than that shown in Fig. 1. The filament circuit may be traced from the positive pole of the current source 26 through the filaments 32 and 35 in parallel, through resistance 60, lead 62, filament 29 of tube 22, which is shunted by resistance 63 and back to the source of current 26 through resistance 28 and the potentiometer 27. The resistance 63 limits the filament current of tube 22 to its proper value.

With the filaments of the tubes connected as shown the negative grid bias for both tubes is obtained from the voltage drop across the single resistance 60 in the common branch of the grid circuits. The high resistance 61 for limiting the value of the output of tubes 24 and 25 when heavy surges of lightning tend to drive either of the grids positive, is also placed in the common branch of the input circuit as shown. The resistance 61 serves the same purpose as the resistances 50 and 51 of Fig. 1. Consequently, this embodiment of the invention not only gives a very well balanced circuit, but also represents a saving in cost on account of the decreased number of resistance elements which are necessary.

Although the invention has been described in connection with a specific embodiment thereof, it is nevertheless capable of broad application as will be at once apparent to those skilled in the art and is to be limited therefore only by the scope of the appended claims.

What is claimed is:

1. The combination with an electrical transmission system having a plurality of receiving channels operating on different frequency bands, and means for directing said frequency bands into their respective channels comprising selectively tuned circuits, of a common path for transmitting the signals of said frequency bands and means therein for discriminating between the signaling energy and excess surges of energy, comprising a pair of three-electrode vacuum tubes arranged in balanced relation, said pair of balanced tubes having amplifying properties over a portion of said input range, modulating properties over another range and saturating properties over a third range, and means for operating said pair of balanced tubes to transmit said signal frequency bands without causing intermodulation thereof sufficient to produce signal distortion and to prevent the transmission of excessive surges of energy to said receiving channels.

2. In a multiplex carrier telegraph system, apparatus comprising a plurality of sending and receiving channels, and means for directing the incoming signals into their respective receiving channels, other means comprising a filter for excluding the outgoing signals from said receiving channels and means in a path common to said receiving channels for preventing the energy received thereby from exceeding a predetermined value.

3. In a multiplex carrier telegraph system, a line and terminal apparatus associated therewith, comprising a plurality of sending and receiving channels, a plurality of receiving selective circuits for directing the incoming signals into their respective receiving channels, a power limiting device between said line and said receiving channels, for excluding currents in excess of said incoming signals from said receiving channels, and means comprising filters to prevent the outgoing currents from being impressed upon said power limiting device.

4. In a multiplex carrier telegraph system, a line and terminal apparatus associated therewith, comprising a plurality of sending and receiving channels, a receiving selective circuit associated with each of said receiving channels for properly discriminating between the incoming signal bands, discriminating means common to said receiving channels for discriminating between currents of different amplitudes flowing in said line comprising a pair of vacuum tubes in balanced relation, said vacuum tubes having an amplifying range and a range of saturation, means for causing said vacuum tubes to operate in said amplifying range when currents of signal amplitudes are in said line but in said range of saturation when currents in excess thereof are in said line to exclude the large currents from said receiving channels, and filters associated with the sending and receiving channels to prevent the outgoing signals from being impressed upon said discriminating device.

5. The combination with an electrical transmission system having a plurality of receiving channels operating on different frequency bands, and means for directing said frequency bands into their respective channels comprising energy storing frequency selective circuits, of a common path for transmitting the signals of said frequency bands and means therein for discriminating between the signaling energy and excess surges of energy, comprising a pair of three-electrode vacuum tubes in balanced relation, and means comprising impedance in the input circuits of said tubes for producing voltage limiting action in the tube input circuits to prevent the transmission of excess surges of energy to said receiving channels.

In witness whereof, I hereunto subscribe my name this 13th day of August, 1928.
THEODORE A. JONES.

In witness whereof, I hereunto subscribe my name this 11th day of August, 1928.
WALTER A. PHELPS.